United States Patent
Jauncey et al.

(10) Patent No.: US 10,233,604 B2
(45) Date of Patent: *Mar. 19, 2019

(54) OIL SPILL RECOVERY VESSEL

(71) Applicants: Paul Jauncey, Aylesbury (GB); Jose Suarez, San Diego, CA (US)

(72) Inventors: Paul Jauncey, Aylesbury (GB); Jose Suarez, San Diego, CA (US)

(73) Assignee: Gobbler Oil Spill Recovery Ltd., Wingrave, Aylesbury, Buckinghamshire (GB)

( * ) Notice: Subject to any disclaimer, the term of this patent is extended or adjusted under 35 U.S.C. 154(b) by 770 days.

This patent is subject to a terminal disclaimer.

(21) Appl. No.: 14/341,830

(22) Filed: Jul. 27, 2014

(65) Prior Publication Data

US 2016/0024736 A1 Jan. 28, 2016
US 2018/0051434 A9 Feb. 22, 2018

Related U.S. Application Data

(63) Continuation of application No. 13/884,556, filed as application No. PCT/IB2011/055008 on Nov. 10, 2011, now Pat. No. 8,795,520.
(Continued)

(30) Foreign Application Priority Data

Dec. 13, 2010 (GB) .................................. 1021014.4
Feb. 8, 2011 (GB) .................................. 1102136.7
Feb. 8, 2011 (GB) .................................. 1102142.5

(51) Int. Cl.
*E02B 15/04* (2006.01)
*C02F 1/40* (2006.01)
(Continued)

(52) U.S. Cl.
CPC ........ *E02B 15/048* (2013.01); *B01D 17/0214* (2013.01); *B01D 17/041* (2013.01);
(Continued)

(58) Field of Classification Search
CPC .... E02B 15/046; E02B 15/048; E02B 15/106; B63B 1/12; B63B 1/125; B63B 35/32; C02F 2103/007; Y10S 210/923
(Continued)

(56) References Cited

U.S. PATENT DOCUMENTS 3,966,614 A * 6/1976 Ayers ................... E02B 15/106
210/242.3
4,428,319 A * 1/1984 Henning ............... E02B 15/048
210/242.3
(Continued)

FOREIGN PATENT DOCUMENTS

WO WO 2012/004712 * 1/2012
WO WO 2012/069949 * 5/2012

*Primary Examiner* — Christopher Upton
(74) *Attorney, Agent, or Firm* — Lewis Brisbois Bisgaard & Smith LLP; Jon E. Hokanson

(57) ABSTRACT

An oil spill recovery vessel (10) is provided that comprises a catamaran bow section (12) with twin hulls between which an oil skimmer unit (11) is arranged for displacement between a lowered, operating, position in oil-polluted water and a raised, non-operational, position clear of the water. Aft of the catamaran bow section (12) is a trimaran main section (13) made up of a central hull interposed between two outer hulls formed by aft continuations of the twin hulls of the catamaran bow section (12); the three hulls of the trimaran main section have conjoined upper portions. A propulsion unit (53) is operative to move the vessel (10) forward at slow speed for skimming operations, and, with the skimmer unit (11) in its raised position, at a fast speed in which the vessel planes on its trimaran main section (13).

10 Claims, 11 Drawing Sheets

Related U.S. Application Data

(60) Provisional application No. 61/416,368, filed on Nov. 23, 2010.

(51) Int. Cl.
*B63B 1/12* (2006.01)
*B63B 35/32* (2006.01)
*B01D 17/04* (2006.01)
*B01D 17/02* (2006.01)
*C02F 103/00* (2006.01)
*C02F 101/32* (2006.01)

(52) U.S. Cl.
CPC ............... *B63B 1/12* (2013.01); *B63B 35/32* (2013.01); *C02F 1/40* (2013.01); *E02B 15/046* (2013.01); *C02F 2101/32* (2013.01); *C02F 2103/007* (2013.01); *C02F 2201/008* (2013.01); *Y02A 20/204* (2018.01)

(58) Field of Classification Search
USPC ... 210/170.05, 170.09, 170.11, 242.3, 747.6, 210/776, 923; 114/61.1, 61.32
See application file for complete search history.

(56) References Cited

U.S. PATENT DOCUMENTS

| | | | | |
|---|---|---|---|---|
| 4,514,299 | A * | 4/1985 | Ayroldi | E02B 15/046 210/242.3 |
| 5,071,545 | A * | 12/1991 | Ashtary | E02B 15/046 210/242.3 |
| 5,073,261 | A * | 12/1991 | Conradi | E02B 15/045 210/923 |
| 5,102,540 | A * | 4/1992 | Conradi | E02B 15/046 210/242.3 |
| 5,158,673 | A * | 10/1992 | Halter | E02B 15/046 210/242.3 |
| 6,221,256 | B1 * | 4/2001 | Kimura | E02B 15/06 210/170.05 |
| 6,743,358 | B1 * | 6/2004 | Lundback | E02B 15/106 210/242.3 |
| 8,343,358 | B2 * | 1/2013 | Immonen | B63B 35/32 210/170.05 |
| 8,673,155 | B2 * | 3/2014 | Jauncey | E02B 15/048 210/170.05 |
| 8,795,520 | B2 * | 8/2014 | Jauncey | E02B 15/046 210/170.05 |

* cited by examiner

Figure 4
(a) 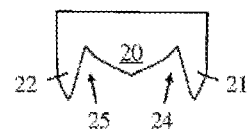
(b) 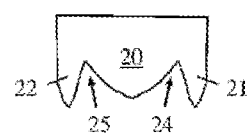
(c) 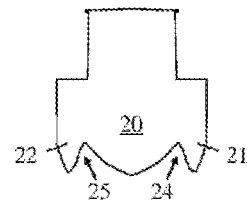
(d) 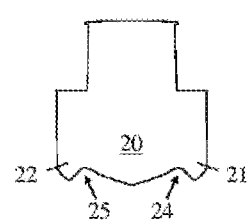
(e) 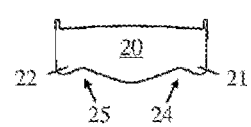
(f) 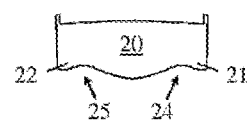
(g) 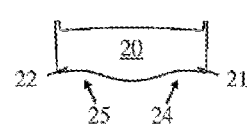

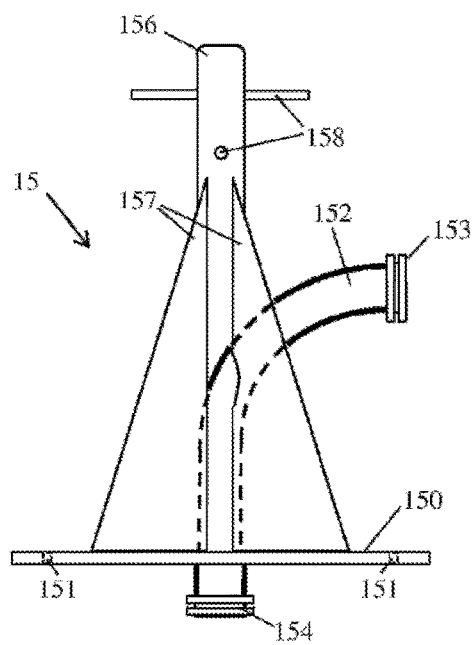
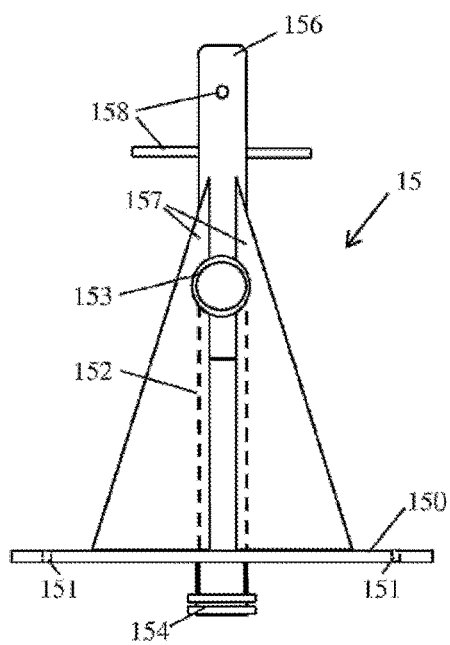
Figure 10        Figure 11
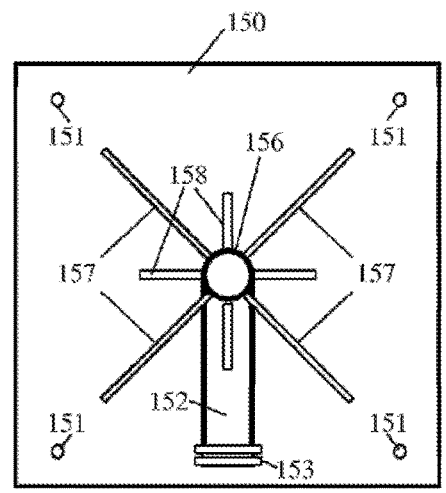
Figure 12

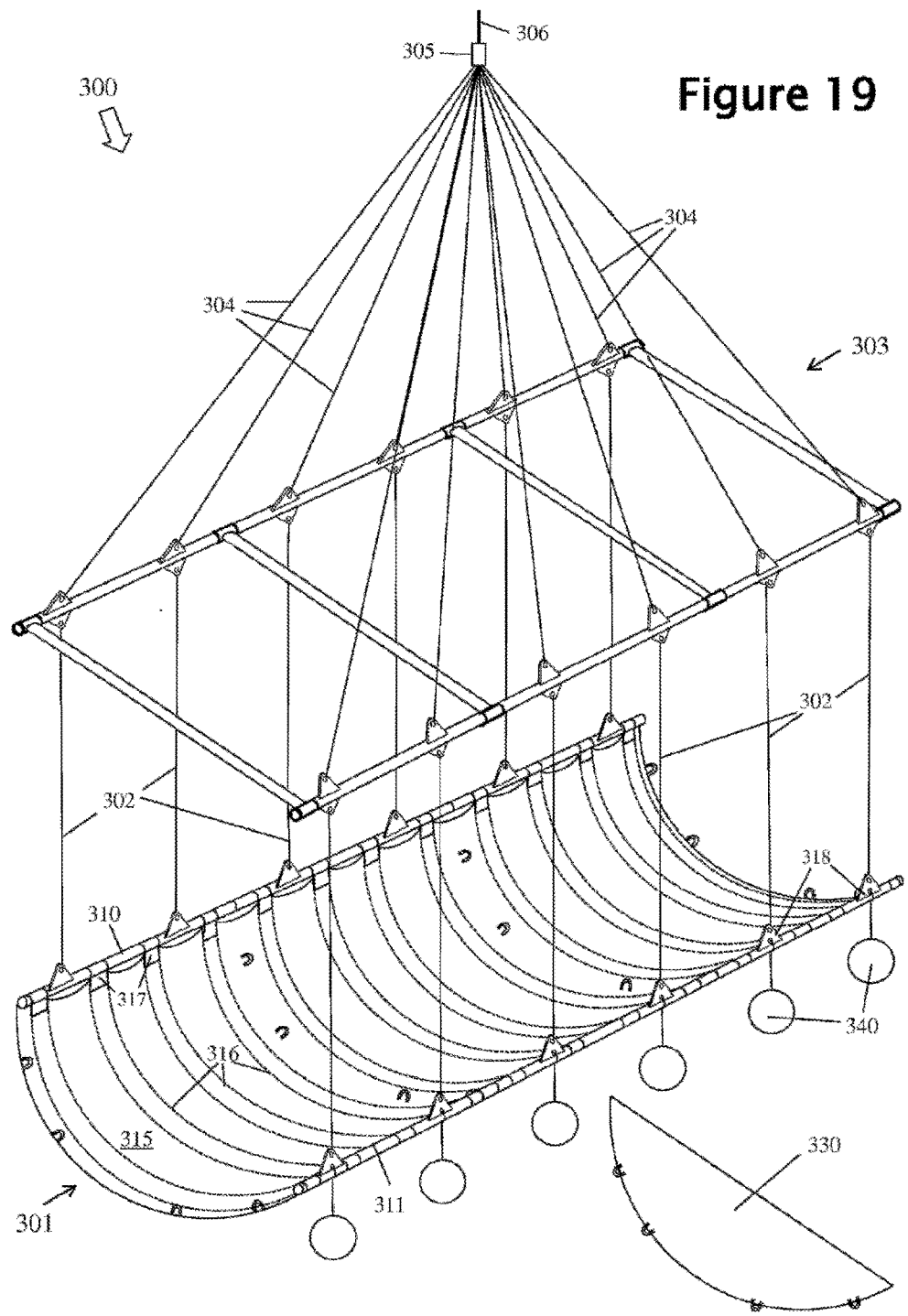

US 10,233,604 B2

OIL SPILL RECOVERY VESSEL

CROSS REFERENCE TO RELATED APPLICATIONS

This application is a continuation of and claims the benefit of U.S. application Ser. No. 13/884,556, filed Nov. 10, 2011, now U.S. Pat. No. 8,795,520, which (i) claims the benefit of U.S. provisional application 61/416,368, filed Nov. 23, 2010 and (ii) is a national filing under 35 U.S.C. § 371 and claims the benefit of International Application PCT/IB2011/055008, having a § 371(c), (1), (2), (4) date of May 9, 2015, and which claims the benefit of Great Britain application 1021014.4, filed Dec. 13, 2010, of Great Britain application 1102136, filed Feb. 8, 2011 and Great Britain application 1102142.5, filed Feb. 8, 2011.

BACKGROUND

Oil spills at sea, in lakes, rivers, harbours, marinas or coastal areas are a serious environmental hazard. Wild life, marine life and coastal welfare, including commercial businesses, are at risk with each and every incident.

In responding to an oil spill, critical factors are speed of response and operational efficiency. These factors tend to favour the use of small skimmer-equipped vessels that can be rapidly transported to the area of an oil spill, can work multiple environments (lakes, rivers harbours and at least inshore), and with the use of the latest drum skimmer technology, are reasonably efficient in recovering oil. In contrast, large oil spill recovery vessels generally take longer to respond as they must make their own way by sea to the area of the oil spill, and are operationally limited to deep water. Larger vessels do, however, typically have the capability to sustain their oil recovery operations over longer periods not least because they have much larger storage tanks for recovered oil than can be installed on smaller vessels.

While the smaller types of oil spill recovery vessel are generally suitable for use inshore and in harbours and rivers, their range of operating environments frequently does not extend, on the one hand, to shallow inland waterways, and on the other hand, to offshore situations.

Accordingly, it is an object of the present invention to provide an oil spill recovery vessel that has improved operational characteristics.

SUMMARY OF THE INVENTION

The present invention is set out in the accompanying claims.

BRIEF DESCRIPTION OF THE DRAWINGS

The accompanying drawings illustrate examples of various aspects of the present invention. The illustrated examples are merely examples and do not limit the scope of the claims.

FIG. 4 shows a series of cross-sectional profiles of the FIG. 1 oil spill recovery vessel;

FIG. 10 is a side elevation of an oil transfer bollard used on the FIG. 1 oil spill recovery vessel;

FIG. 11 is an elevational view of the FIG. 10 oil transfer bollard taken in a direction looking forward relative to the installed orientation of the bollard on the FIG. 1 oil spill recovery vessel;

FIG. 12 is a plan view of the FIG. 10 oil transfer bollard;

FIG. 19 is a perspective view of a lifting rig for use in lifting a bladder containing recovered oil out of the water;

DETAILED DESCRIPTION

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with the example is included in at least that one example, but not necessarily in other examples.

Figure 1:
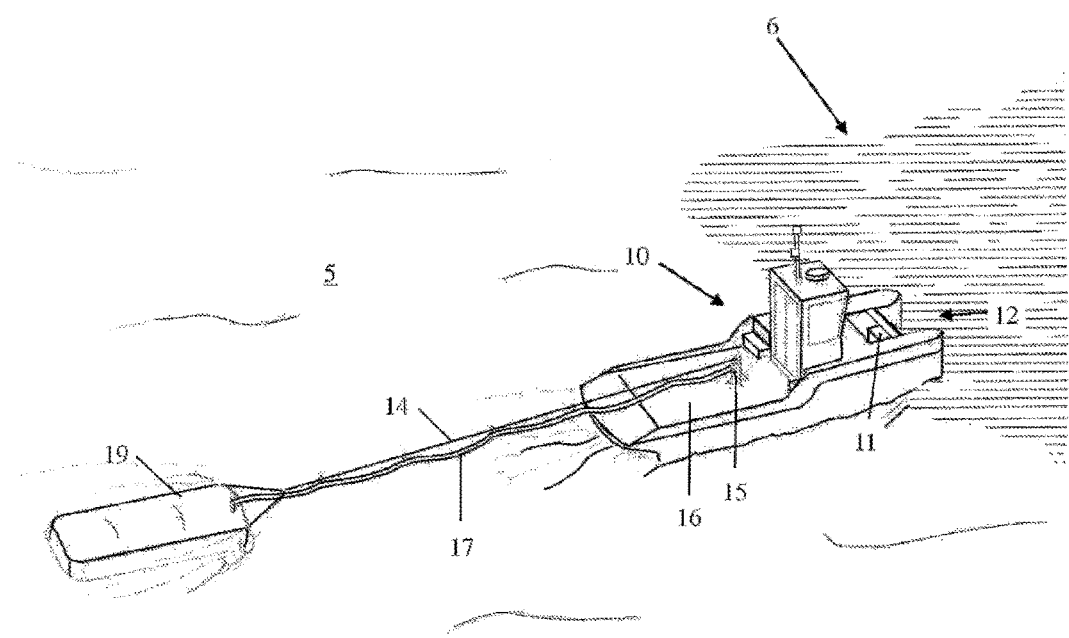
FIG. 1 is a diagram illustrating operation of an oil spill recovery vessel with oil recovered by a skimmer sub-system of the vessel being transferred to a towed bladder.

FIG. 1 depicts an oil spill recovery vessel (OSRV) 10 in an operational mode in which a skimmer unit 11, carried between twin hulls of a catamaran bow section 12 of the OSRV 10, recovers oil from an oil spill 6 on a body of water 5 as the OSRV moves through the oil spill, the recovered oil then being transferred to a towed bladder 19 without interruption of the skimming operation; in this mode of operation, the recovered oil is not stored on the OSRV 10 though it may undergo some processing aboard, for example, to separate out water which the skimmer unit may output along with the recovered oil. The bladder 19 is towed by a towing cable 14 attached to a towing post of an oil transfer bollard 15 (described in detail hereinafter) mounted on an aft towing deck 16 of the OSRV. Recovered oil is transferred to the bladder 19 through a flexible oil transfer hose 17 that is attached at one end to an oil transfer pipe forming part of the oil transfer bollard 15, and at its other end to a hose coupling integral with the bladder 19; along its length the hose 17 is suspended from the towing cable 14 by slip rings.

General Form of OSRV

Figure 2:
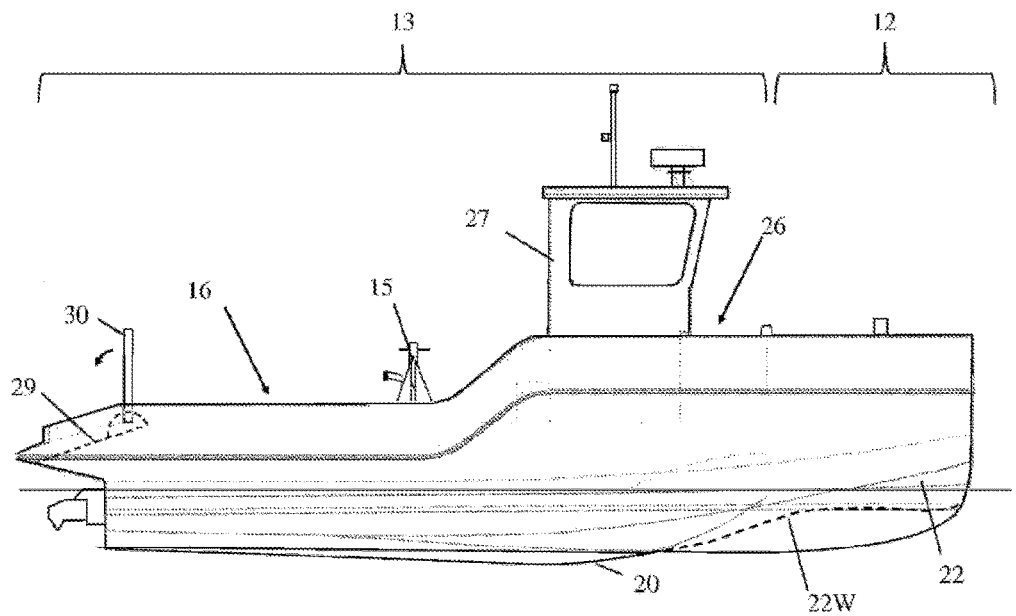
FIG. 2 is a side elevation of the FIG. 1 oil spill recovery vessel.
Figure 3:
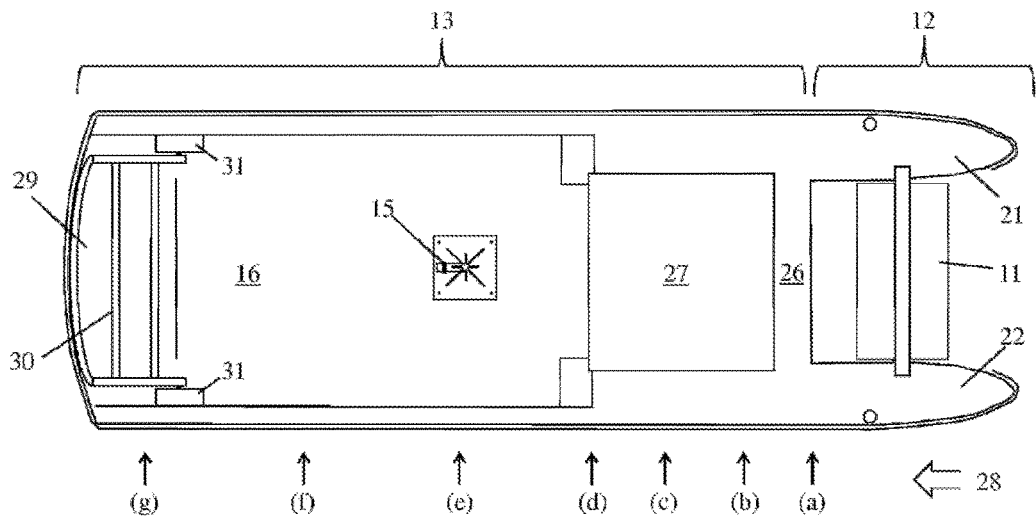
FIG. 3 is a plan view of the FIG. 1 oil spill recovery vessel.

The general form and hull shape of the OSRV 10 is illustrated in FIGS. 2 to 4. Aft of the catamaran bow section 12 with the skimmer unit 11, the OSRV comprises a trimaran main section 13 in which a central hull 20 is interposed between the aft continuations of the twin hulls 21, 22 of the catamaran bow section 12. The triple hulls 20, 21, 22 of the trimaran main section 13 have conjoined upper portions with the depth of this conjoining increasing afterwards whereby to define two flow channels 24, 25 of decreasing cross-sectional area between the hulls. This can be seen in FIG. 4 (*a*) to (*g*) which show a succession of cross-sectional profiles moving aft along the OSRV 10; the location of each profile (a) to (g) along the length of the OSRV 10 is indicated in FIG. 3 by the correspondingly-lettered arrows 28.

When in the process of oil recovery using the skimmer unit 11, the OSRV 10 operates at slow speed (1-3 knots) and the hulls 21, 22 of the catamaran bow section 12 serve to channel the oil to be recovered to the skimmer unit 11; at the same time, the channels 24, 25 formed between the central hull 20 and the outer hulls 21 and 22 of the trimaran main section 12 help the flow through of water passing under or around the skimmer unit thereby minimizing pile up of the water in front of the skimmer unit 11.

As will be more fully described below, when oil is not being recovered the skimmer unit 11 can be raised clear of the water 5 enabling the OSRV to proceed at a fast speed (for example, 18-20 knots) and thereby minimize transit time to and from an oil spill. When the OSRV 10 is operating at its fast speed, the trimaran section of the vessel will cause it to plane partially lifting the bow section hulls 21, 22 and keeping the wetted areas to a minimum thereby reducing drag.

Regarding the general above-water arrangement of the OSRV 10, the catamaran bow section 12 and the front part of the trimaran main section 13 provide a raised fore deck 26. Most of the deck area of the main section 13 serves as the towing deck 16 on which the oil transfer bollard 15 is located; the towing deck 16 is at a lower level than the fore deck 26. A dismountable wheelhouse structure 27 is located on the front part of the trimaran main section 13 and provides the upper part of a wheelhouse; the wheelhouse extends down into the main section 13 such that the floor of the wheelhouse is substantially at the level of the towing deck 16. The dismountable wheelhouse structure 27 is, for example, secured in position by four bolts accessible from inside the wheelhouse.

The aft end of the towing deck 16 merges with a scooped transom 29 that slopes downwards towards the stern. An aft deck rail 30 is arranged to fold down from an upright position shown in FIG. 2 to a towing-operation position shown in FIG. 3 in which it lies against the scooped transom 29. The aft deck rail 30 is moved between its upright and towing-operation positions by hydraulic cylinders 31. The rail 30 is, for example, made from 38 mm alloy tube and has a height of approximately 1 m when in its upright position. The rail is slightly curved in the middle to match the curvature of the scooped transom.

The hull and wheelhouse structure are, for example, made of FRP (fibre reinforced plastic) though other materials, such as aluminum can alternatively be used. Where FRP is used, the bow and main sections 12 and 13 are treated as one and formed as two moldings, that is, a deck molding (including an uppermost portion of the hull), and a middle-and-lower hull molding; these moldings are arranged to fit closely together and a rub strake is used to cover the join.

Typical dimensions for an OSRV 10 of the above described form are:

LOA 8.85 m
Beam 2.55 m
Draft (nominal) 0.45 m
Freeboard at foredeck 1.52 m
Freeboard at towing deck 0.96 m
Height from keel to wheelhouse top 3.25 m A vessel of such dimensions appropriately fabricated from FRP and fully fitted out would typically have:

Weight when lifted (trailer weight) 3.00 Tonnes
Displacement laden 3.50 Tonnes and be Llyods Register/American Bureau of Shipping (ABS) certifiable to 60 nautical miles from shore or from a mothership (daylight operation), that is, capable of handling 2 m waves; as used herein "offshore seaworthiness" means seaworthiness to this level of Llyods/ABS certification.

It will be appreciated that the hull forms can be varied from those illustrated. For example the twin hulls 21, 22 of the catamaran bow section 12 can be made shallower to enable the OSRV 10 to approach right up to a beach (see dashed line 22W in FIG. 2); in this case, the bows of the twin hulls 21, 22 will lift clear of the water when planing but will sit in the water during slow speed skimming operation, guiding oil towards the skimmer unit.

Propulsion and Central Services

Figure 5:
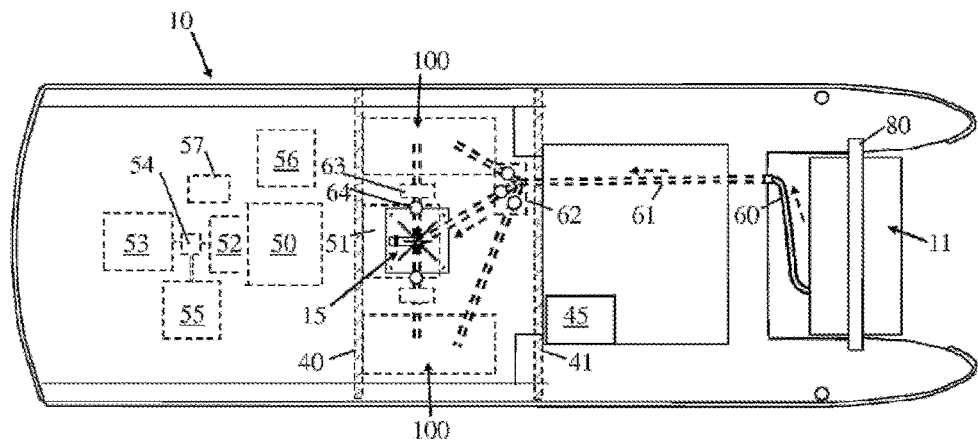
FIG. 5 is a plan view, similar to FIG. 3, but with the nearside hull removed to show the internal layout of the FIG. 1 oil spill recovery vessel.
Figure 6:
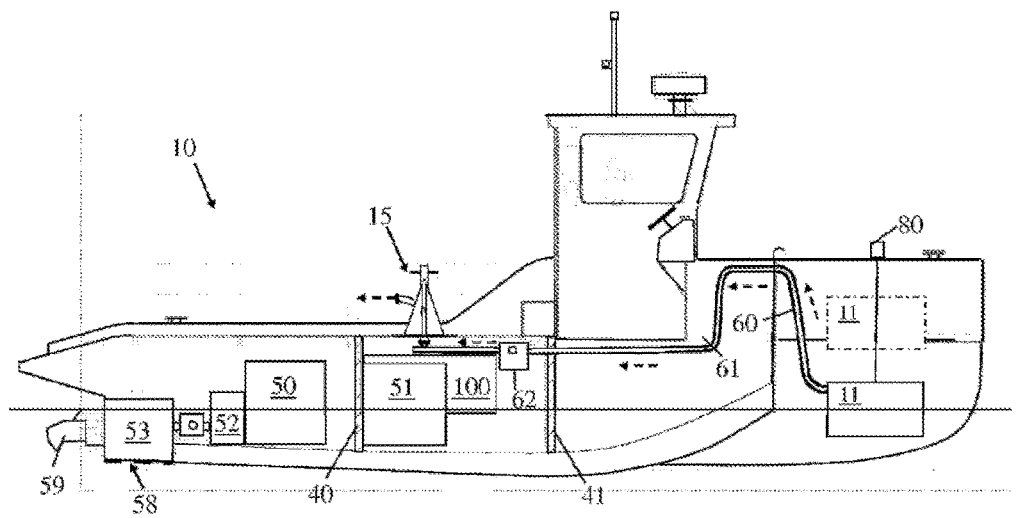
FIG. 6 is a side elevation, similar to FIG. 2, showing the internal layout of the FIG. 1 oil spill recovery vessel.

FIGS. 5 and 6 show the general disposition within the OSRV 10 of its propulsion system and central service equipment (hydraulic and electrical power).

Propulsion System

A marine diesel engine 50 (for example, 250HP (184 kw) 4200 rpm supercharged marine diesel) serves both to provide propulsive power and power for the central services. Fuel is supplied to the engine 50 from a fuel tank 51 located between fireproof bulkheads 40, 41. The compartment defined by the bulkheads 40, 41 also houses two oil separators 100 and tanks for hydraulic fluid; in a preferred arrangement, these tanks are incorporated into the oil separators 100 to heat oil in the latter.

The propulsion system comprises a water jet drive unit 53 (such as the Ultra-Jet 251 jet drive) powered from the engine 50 via a transmission (such as an Aquadrive transmission from Mack Boring & Parts Co, NJ, USA) comprising a shaft with a constant velocity joint fitted to each end. One of these joints couples to the jet drive unit 53, and the other to a reversible hydraulic marine gearbox 52 (such as the PRM 750 from PRM Marine Ltd, UK). The water intake for the jet drive unit 53 is directly below it and is protected by a screen 58. The water jet outlet is a large central duct through the stern of the vessel just on the water line. Steering is effected by a hydraulically operated steering cylinder which moves a deflector plate 59 to direct the water jet produced by the unit 53 to port or starboard. The jet drive outlet and steering deflector are protected by the transom overhang during the launch and recovery of towed bladders. All controls for the engine 50 and jet drive unit 53 are located in the wheelhouse.

The water jet from the jet drive unit 53, as well as providing propulsion, also serves to entrain the oil/water mix that by-passes the skimmer 11 and passes beneath the OSRV (principally via channels 24, 25); this entrainment helps to prevent a "pile up" of oil/water at the front of the OSRV.

As the transmission from the engine 50 to the water jet unit 53 is reversible, the flow of water through the unit 53 can be reversed to enable "back-flushing" of the jet drive intake screen 58 in the event of blockage by debris; this eliminates the need to dive under the boat to clear debris which can be hazardous in certain environments (for example, swamplands where alligators may be present or at sea in shark infested waters).

The propulsion system is selected to give a speed of the order of 18-20 knots for transit to/from an oil spill site and a slow seed of 1-3 knots for use when skimming to recover oil. Typical range is of the order of 180 nautical miles.

Central Services

Regarding the central services, dual pressure hydraulic power is provided by two tandem mounted hydraulic pumps 55 driven by a transmission mounted power take off unit 54 (alternatively, this power take off may be integral with the gearbox 52). The hydraulic pump 55 supplies a central pressurised ring main (not shown, but typically stainless steel tube or similar) that distributes hydraulic pressure around the vessel; the pressurised ring main is matched by a corresponding return ring main. Drip-less quick release pressure/return connectors are strategically installed around the pressurised ring main for powering standard-supply or optional equipment. One use of this hydraulic power is to drive a hydraulically powered electric alternator unit 56 providing 110 volt ac supply as a central service; advantageously, the alternator is a synchronous spark free alternator. Another use of the power provided by the central hydraulic service is to power the skimmer unit 11 and an associated lifting arrangement. Other equipment that can conveniently be powered from the central hydraulic service includes pressure washing equipment, power capstans, fire fighting pumps and/or other ancillary equipment/controls, by simply "plugging in".

A primary use for the 110 v ac supply is to power an aircon/UV (Ultra Violet) air purification system 45 for the wheelhouse.

Another central service is an additional, 12 v, electrical supply, this being provided by a high capacity alternator 57 that, for example, is belt driven off a front "accessories" pulley of the diesel engine 50.

Oil Recovery System

The oil recovery system of OSRV 10 comprises the skimmer unit 11, the on-board oil handling and processing system (including the oil separators 100), and the oil transfer bollard 15. Before describing in detail individual elements of the oil recovery system, a general description of the system will first be given with reference to FIGS. 5 and 6 (certain external features of the OSRV, such as the aft deck rail 30, have been omitted from these Figures so as not to obscure internal layout details).

As already noted, the skimmer unit 11 can be raised out of the water when not needed (the position of the unit 11 when raised is shown in dashed outline in FIG. 6), and subsequently lowered back into its operating position (shown in full lines in FIG. 6). Raising and lowering of the skimming unit is effected by a lift arrangement 80 powered from the central hydraulic service. When in its operational position, the skimmer unit is free-floating but constrained in position by a 'cat's cradle' of wires, as will be more fully described below.

Oil recovered by the skimmer unit 11 is pumped away from the unit through flexible hose 60 and then through fixed pipe-work 60 to a directional manifold valve 62 that permits the recovered oil, still with a small amount of water (e.g. 3%), to be selectively fed either direct to the oil transfer bollard 15 for transfer to a towed storage bladder 19 (as depicted in FIG. 1), or first to the separators 100 for removal of most of the remaining water and from there, via pumps 63 and valves 64 (only referenced in FIG. 5 in respect of one of the separators 100) to the oil transfer bollard 15. Preferably, the valves of the directional manifold valve 62 and the valves 64 operate on an interlocked basis to ensure only permitted flows are possible.

Skimmer Unit

Figure 7:
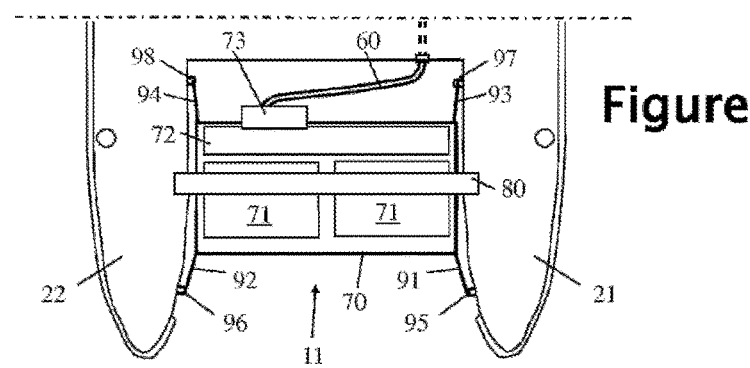
FIG. 7 is a plan view of a catamaran bow section of the FIG. 1 oil spill recovery vessel showing details of a skimmer sub-system.

The skimmer unit 11 is a floating drum oil skimmer such as the Elastec TDS118G model available from Elastec/American Marine, Ill., USA; this model has a maximum collection rate of 78 US gallons per minute (16 tonnes per hour). The general form of this model of skimmer is shown in FIG. 7 and comprises a frame 70 supporting two grooved drums 71 powered by internal hydraulic motors, an oil-collecting reservoir 72, and a hydraulic pump 73 for pumping oil from the collecting reservoir 72—in the present case, into the hose 60. The hydraulic motors and the hydraulic pump 73 are powered through flexible hydraulic hoses (not shown) from the central hydraulic service of the OSRV 10.

Figure 9:
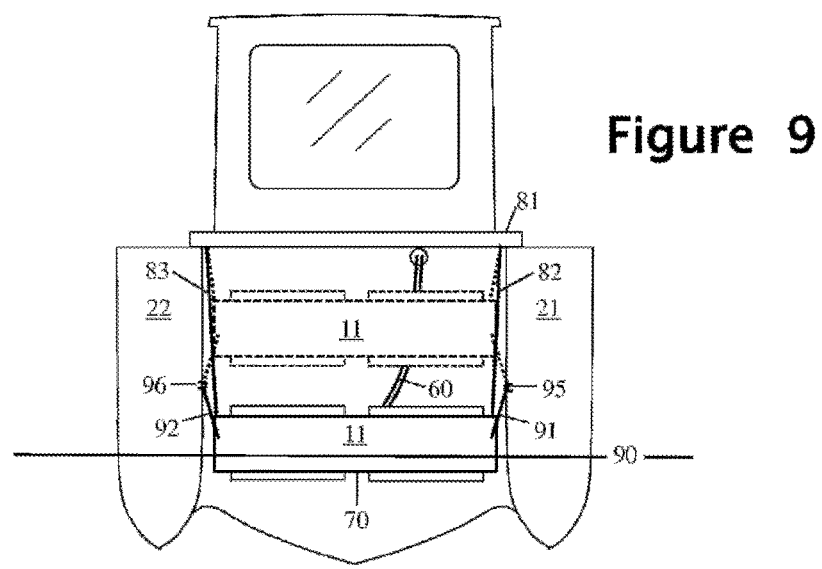
FIG. 9 is a front elevation of the FIG. 1 oil spill recovery vessel showing further details of the skimmer sub-system.

When the skimmer unit 11 is deployed, that is, in its lowered, operating, position shown in full lines in FIG. 9, it floats on the water (the water surface is shown by line 90 in FIG. 9); in oil, extra buoyancy is required to support the weight of the pump 73 and this is provided by the addition of appropriately sized, waterproof flotation tanks (not shown) welded to the skimmer frame 70. The total draft of the entire unit including the pump, when supported by the additional flotation tanks, is 75 mm.

An anti splash cover (not shown) can be attached to the front of the skimmer frame 70 to prevent overspill of sea water into the oil reservoir in rougher conditions.

Skimmer Lifting Arrangement

Figure 8:
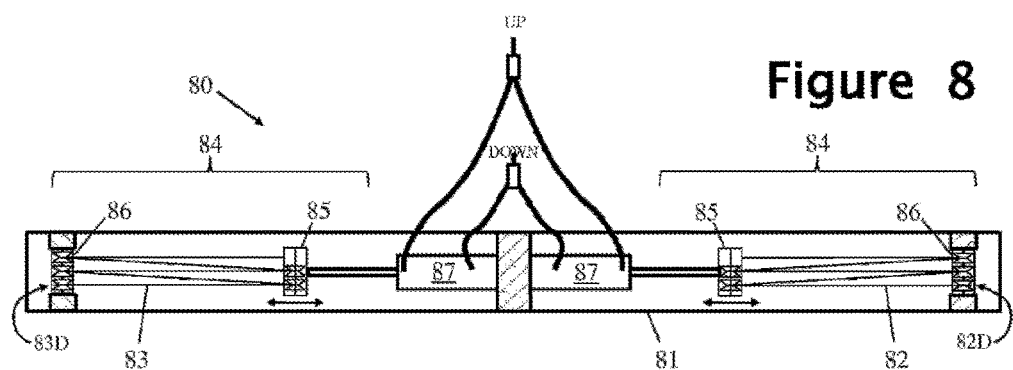
FIG. 8 is a diagram of a skimmer lifting arrangement of the skimmer sub-system.

FIG. 8 shows the details of the lifting mechanism of the lifting arrangement 80 used to raise and lower the skimmer unit 11. The lifting mechanism is housed in a square alloy tube 81 with the blanked-off ends; this tube 81 extends between the port and starboard hulls 21, 22 of the OSRV catamaran bow section (see FIG. 7). Port and starboard lift lines 82, 83 (see FIG. 9) pass through the underside of the tube 81 adjacent its ends and descend to the skimmer unit 11 where they are attached at mid positions along respective sides of the skimmer frame 70. In FIG. 8 the descendant legs of the lift lines 81 and 82 are not visible other than in top end view; the descent positions are indicated by arrows 82D and 83D respectively. The lift lines 82, 83 are, for example, nylon or stainless steel.

The lift mechanism housed in the tube 81 comprises two symmetrically arranged port and starboard pulley systems 84 respectively threaded by the port and starboard lines 82, 83 and powered by respective double-acting hydraulic cylinders 87. More particularly, each pulley system 84 comprises a movable pulley block 85 carried by the piston rod of the corresponding hydraulic cylinder 87, and a fixed pulley block 86 mounted at the outboard end of the tube 81. In the present example, the pulley block 85 comprises two pulleys and the pulley block 86 comprises three pulleys. The lift lines 82, 83 thread the pulleys of their respective pulley systems 84 and terminate fixed to the moving block 85, giving a mechanical advantage of five. Powering the cylinders 87 to move the blocks 85 towards each other, results in the skimmer unit 11 being raised. Powering the cylinders 87 to move the blocks 85 away from each other, results in the skimmer unit 11 being lowered under its own weight. The cylinders 87 are powered from the central hydraulic service (the associated hydraulic hoses are not shown for simplicity) and appropriate controls are located in the wheelhouse.

It will be appreciated that numerous other arrangements are possible for raising and lowering the skimmer unit and actuators other than hydraulic cylinders (for example, pneumatic actuators or electric motors) can be used; however, the lifting arrangement described above is compact, lightweight and efficient.

Cat's Cradle

The cat's cradle for constraining displacement of the skimmer unit 11 when deployed in its lowered, operational position will now be described with reference to FIGS. 7 and 9. This cat's cradle comprises four lines 91-94 each of a set length. One end of each line 91-94 is attached to the frame 70 of the skimmer unit 11 (at the same level, for example, on top of the frame or half way down as illustrated in FIG. 9). The other end of each line 91-94 is secured by a respective D ring 95-98 to the OSRV hull. Two of these D rings (D rings 95, 96) are fixed forward of the skimmer unit 11 on the inside faces of the port and starboard bow-section hulls 21, 22 respectively; the other two D rings (D rings 95, 96) are fixed aft of the skimmer unit 11 on the inside faces of the port and starboard bow-section hulls 21, 22 respectively. The vertical location of the D rings 95-98 is just below that assumed by the attachment points of the lines 91-94 to the skimmer unit 11 when the latter is midway between its raised and lowered positions.

When the skimmer unit is in its lowered, operational position in which it is floating, the lines 91-94 will be downwardly angled and the lengths of the lines 91-94 are set such that they will be slightly slack (assuming that the OSRV and skimmer are stationary). When the skimmer unit is raised, the lines 91-94 become upwardly angled and in due course become taut as the skimmer unit reaches its raised position with the cylinders 87 fully retracted; the skimmer unit is thus held firmly in a geometrically locked position when in its raised position by a combination of the lifting lines 82, 83 and the cat's cradle lines 91-94 (in FIG. 9, the positions of the lines 82, 83, 91 and 92 when the skimmer unit 11 is fully raised are shown dotted).

When the skimmer unit 11 is in its lowered operational position and the OSRV 10 is moving forward at its slow working speed, the forward motion of the OSRV will put enough "load" on the cat's cradle lines 91, 92 to "tow" the skimmer unit 11 steadily through the oil to be recovered. The oil/water bypassing the skimmer unit between the bow-section hulls 21, 22 will tend to centralize the skimmer unit between the hulls 21 and 22. Furthermore, because the hulls 21, 22 are downwardly tapered, there is room for the skimmer unit 11 to move from side-to-side to accommodate wave action. As a precaution, rubber strips can be fitted to the sides of the skimmer unit 11 to cushion any impacts with the hulls 21, 22.

It will be appreciated that other forms of tethering arrangement, other than the illustrated cat's cradle, are possible for constraining movement of the skimmer unit; indeed, a very simply form of tethering arrangement can be provided by just using the lines 91 and 92 (though this would mean that checking of the forward motion of the skimmer unit upon OSRV slow-down would need to be provided by the lifting lines 82, 83).

Oil/Water Separator

Various forms of oil/water separator are known and all generally rely on the fact that, as the specific gravity of oil is around 0.9, oil will float on water enabling it to be separated. The separators 100 may be of any form and may operate either in a continuous mode in which is drawn off continuously (that is, the suction pumps 63 are operated all the time), or in an intermittent, cyclic, mode in which oil is drawn off on an intermittent basis. More particularly regarding intermittent mode operation, each separator 100 is, for example, provided with upper and lower oil-level sensors respectively arranged to detect the oil level in the separator rising to an upper level, and falling to a lower level; oil is sucked out of the separator (by activation of the corresponding pump 63) commencing when the oil level reaches the upper level detected by the upper oil-level sensor, and subsequently terminating when the oil level falls to the lower level detected by the lower oil-level sensor.

Although it has been assumed that oil will be pumped from the separator for storage (for example in towed bladder 19—see FIG. 1), the separator 100 can itself be used for storage of limited quantities of oil.

Oil Transfer Bollard

Oil recovered by the skimmer unit 11 is pumped either directly, or via the separators 100, to the oil transfer bollard 15. As depicted in FIG. 1, the bollard 15 is fixed in position on the towing deck 16 of the OSRV 10 substantially centrally along the fore-aft axis of the latter. The oil transfer bollard 15 provides the means to transfer recovered oil, via a transfer hose 17, to a floating 19 bladder, and simultaneously to tow the bladder 19, without impairing steerage, using a towing cable 14. With the towing cable 14 appropriately shorter in length than the transfer hose 17, the cable will take the full load of the towed bladder 19 thereby avoiding strain on the hose 17. Both hose 17 and cable 14 flex/pivot at substantially the same point, namely, the bollard 15 whereby ease of steerage is maintained as the OSRV 10 can effectively swivel around the bollard 15. Use of the oil transfer bollard 15 means that operation of the OSRV 10 is not compromised by only being able to store recovered oil to onboard storage tanks or bladders; instead, oil can be transferred off the OSRV continually while skimming (apart from occasional pauses to change bladders when the currently-towed bladder becomes full).

The construction, installation and usage of the oil transfer bollard 15 is further described below in respect of an example where the bollard takes the form of a stand-alone unit that can be mounted on a vessel as and where desired (as opposed to an oil transfer bollard constructed in situ, which is also possible).

Referring to FIGS. 10 to 12, the unit-form oil transfer bollard 15 (hereinafter "bollard unit 15") comprises a base plate 150 provided with bolt holes 151 to enable the bollard unit 15 to be bolted to any sturdy deck area.

A rigid, curved, oil transfer pipe 152 extends upwards through a central hole in the base plate 150 and is welded (or otherwise secured to) the base plate. The upper end portion of the pipe 152 curves round to the horizontal. The lower end of the upwardly-extending portion of the oil transfer pipe is provided with an oil inlet coupling 154 and the free end of the horizontal portion of the oil transfer pipe 152 is provided with an oil outlet coupling 153—preferably, standard universal quick release hose connections are used for the couplings 153, 154. When the bollard unit 150 is installed on a deck, the oil inlet coupling will be located below the deck for connection to a pipe or hose that serves to supply recovered oil to the bollard unit 15.

A towing post 156 is welded (or otherwise securely fixed) to the upper part of oil transfer pipe 152 coaxially with the latter. The towing post 156 is rigidly supported by front and rear vertical gussets 157 that serve to substantially eliminate tow loading on the oil transfer pipe 152 when the bollard unit 15 is being used to tow a bladder. The towing post 156 has a pair of vertically spaced orthogonal cross bars 158 to locate the towing cable. The height of the bollard unit 15 is chosen to provide adequate cable clearance when under load above the aft deck structure of the vessel for which the bollard unit is intended; a typical height from deck to the lower cross bar 158 is 0.5 m.

The bollard unit 15 is installed on the towing deck 16 of the OSRV 10, being optimally positioned on the fore-aft centreline of the OSRV 10, approximately centrally (that is, centre of gravity ±10% of the vessel's length) or more forwardly. The position of the bollard unit can be moved more towards the stern but this progressively increases the difficulty of steering when towing a bladder; the bollard unit is preferably at least one third of the vessel's length from the stern. In the present example, securing the bollard unit to the deck of a vessel simply involves bolting the unit in position (with the oil outlet coupling 153 of the oil transfer pipe 152 facing aft) using bolts passed through the holes 151 of the base plate 150 and corresponding holes in the deck. Additional bolt holes can be drilled as required. With the bollard unit 15 secured in position, the oil inlet coupling 154 can be connected up to the pipe or hose that will provide the recovered oil directly or indirectly from the skimmer unit.

As will be well understood by persons skilled in the art, it may in certain cases be desirable to reinforce the deck (for example, using backing plates) in the area where the oil transfer bollard unit is installed; this will depend on the nature of the deck (material and thickness), the location of underlying structure such as bulkheads, and the intended maximum towed load.

Figure 13:
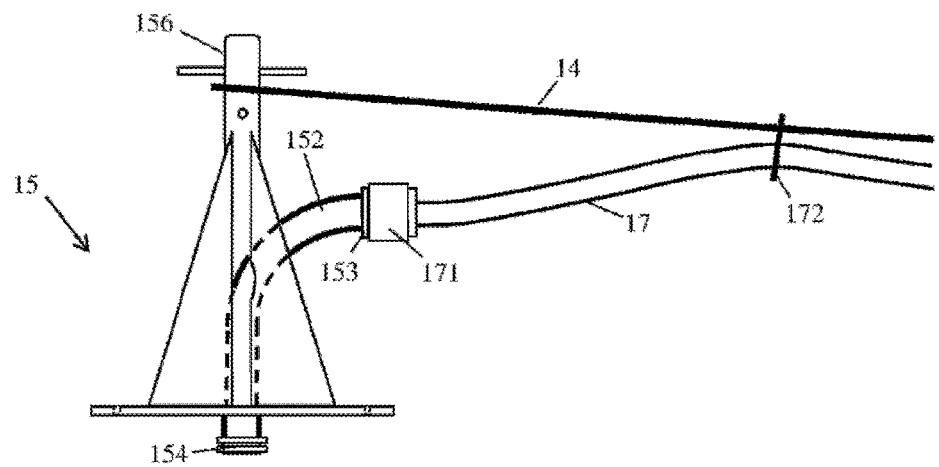
FIG. 13 is a side elevation of the FIG. 10 oil transfer bollard illustrating operational use of the bollard.

To put the oil transfer bollard 15 to use, a towing cable 14 (for example, a 10 mm diameter stainless steel cable.) is looped over the towing post 156 of the bollard 15 and located between cross bars 158 to prevent it sliding up or down the post (see FIG. 13). The other end of the cable 14 is connected to a bladder to be towed (the bladder itself will generally be provided with a towing harness to which the cable can easily be coupled). An oil transfer hose 17 is connected to the outlet coupling 153 of the oil transfer pipe 152 of the bollard 15 using a coupling 171 that is integral with the hose and of complementary form to the outlet coupling 153. The opposite end of the oil transfer hose 17 is directly connected to an input of the towed bladder. As already noted, the towing cable 14 must be of a lesser length than the oil transfer hose 17 to avoid strain on the hose. Preferably, the hose 17 is supported along its length (or at least over its portion above the towing deck 16) by rings, cable ties, or the like, generally referenced 172 in FIG. 13, that pass around the hose 17 and cable 14, and allow relative slippage of the hose and cable.

When the OSRV 10 is operating to recover oil (moving slowly ahead with the skimmer unit 11 in its lowered position and powered on), then assuming the oil flow control valves are appropriately set to supply recovered oil to the oil transfer bollard either directly from the skimmer unit 11 or indirectly via the separators 100, oil will be pumped through the oil transfer pipe 152, into the transfer hose, and across into the towed bladder 19 for storage.

When a towed bladder 19 is full, the oil recovery process is temporarily suspended while the bladder is capped, identified and set free for later collection. The hose and cable are easily disconnected from the towed bladder either by reversing the OSRV to the bladder or by winching the bladder to the boat using the towing cable; either way, the use of jet drive propulsion effectively eliminates any risk of the towing cable becoming entangled with the OSRV. Once a full bladder has been detached, another, empty, bladder can then be connected and the oil recovery process continued. At a convenient time, the filled bladders that have been set free can be collected—for example, connected as a "necklace" and towed to shore for pump out. The used of towed bladders that are set free when full eliminates the need for constant trips to a shore-based pump-out facility and enables a suitably equipped OSRV to operate 24/7 (assuming a mother ship is on station to provide vessel re-fuelling, crew changes and a constant supply of replacement bladders).

It may be noted that when the OSRV 10 is recovering oil in shallow locations, use of a towed bladder may be impractical due to surf, debris, or vegetation making steerage with a towed bladder very difficult. In this event, a conveniently-sized bladder can be securely installed on the towing deck 16 of the OSRV and directly coupled to oil outlet connection 153 of the oil transfer bollard 15. When full, this deck-carried bladder can be pumped out at a dock or into a tanker as with a skimmer vessel fitted with integral storage tanks for recovered oil. It is also possible to use the separators 100 to temporarily store a limited amount of recovered oil.

Many variants are possible to the above described form of oil transfer bollard unit. For example, the oil transfer pipe can be offset from the towing post along the fore-aft axis of the vessel and/or laterally, though preferably the outlet coupling of the oil transfer pipe should lie within 1.5 m of the towing post. In further variants, the top of the oil transfer pipe can be made rotatable about a vertical axis relative to the lower portion of the pipe. These and other variants of the oil transfer bollard are disclosed in GB patent specification GB2473165-A herein incorporated by reference.

Regarding the bladder towing cable, this is, for example, a 10 mm diameter stainless steel cable. It will be appreciated that when loaded the towing cable could potentially chafe a significant groove into the OSRV deck. This is avoided in the present example of the OSRV 10 by the following features:

with respect to the transom 29, during towing operations the aft deck rail 30 is folded down against the transom 29 and serves as an anti chafe unit; the folded-down rail 30 also guides the cable/hose combination "up and over" the bulwarks during a turning/maneuvering situation;

with respect to the bulwarks, these are capped with an alloy strip as protection from chafe.

Of course, proper choice of the length of towing cable used should ensure that when the cable is taut, it adequately clears the vessel. A typical suitable cable length would be such that the bladder is towed at a distance from the vessel of around 8 m and generally no less than 5 m (that is, at least approximately half the length of the OSRV 10). It should, however, be noted that no matter how large a clearance is theoretically provided for between the vessel and cable when towing, wave action on the vessel and bladder will always cause the cable to strike the vessel at times except in millpond conditions.

Storage of Recovered Oil

As already indicated, while it is intended that recovered oil will generally be transferred off the OSRV 10 to a towed bladder, the recovered oil may alternatively be transferred from the bollard 15 to a towing-deck-carried bladder, directly coupled to the oil transfer bollard, for storage or held temporarily in the separators 100.

Regarding the oil storage bladders, suitable bladders are available from Elastec/American Marine, Ill., USA in standard sizes ranging from 1.89 cubic meters (500 US gallons)

to 13.3 cubic meters (3500 US gallons), the latter being 16.5 m in length. With the above-mentioned Elastec TDS118G model skimmer unit, a bladder of 3500 US gallons capacity takes about 45 minutes to fill. Each bladder has a self sealing valve to prevent oil leakage once the transfer hose is removed. In general the smaller bladders are suitable for use as deck-carried storage bladders while the larger sizes are suited for use as towed bladders. Bladders intended to be used as towed bladders will generally be equipped with a towing bridle, be hydro-dynamic when towed, and be brightly coloured; they may also be fitted with light retaining strips along their full length and/or being provided with night lights.

Transportability

Due to its modest weight and dimensions (see the typical figures mentioned above), the described OSRV 10 is well adapted for rapid deployment by land, sea or air transportation to the general area of an oil spill before being put in the water and proceeding at speed under its own power to the oil spill itself. The modest weight and dimensions of the OSRV are occasioned in part by the absence of large onboard tanks for storing recovered oil and by the dismountable wheelhouse structure 27.

Figure 14:
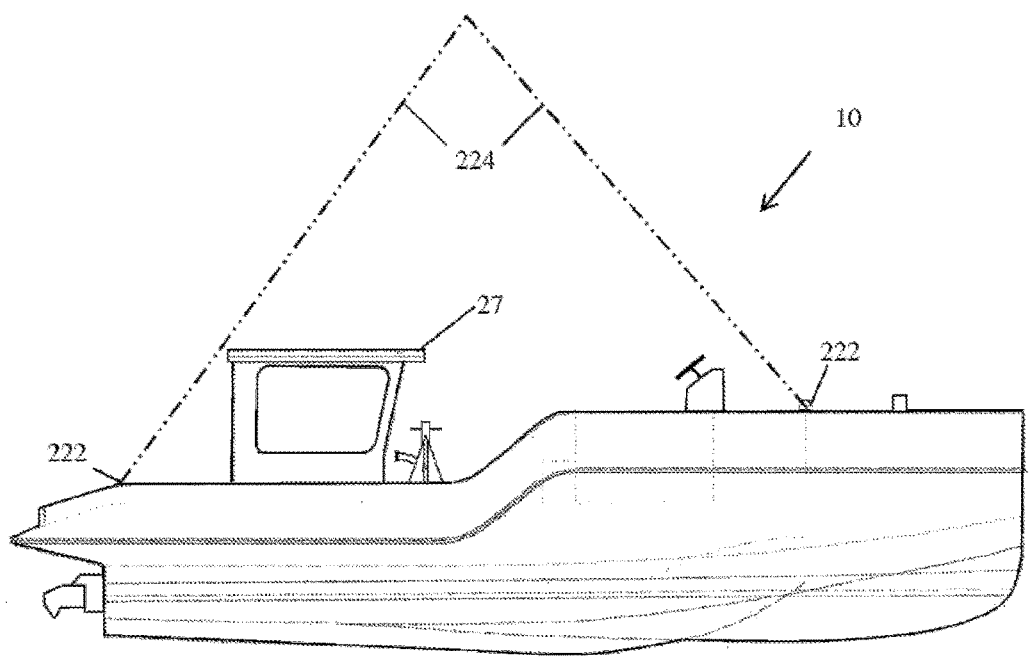
FIG. 14 is a side elevation of the FIG. 1 oil spill recovery vessel illustrating it being hoisted during loading for transportation and showing a wheelhouse structure of the vessel in a dismounted position.
Figure 15:
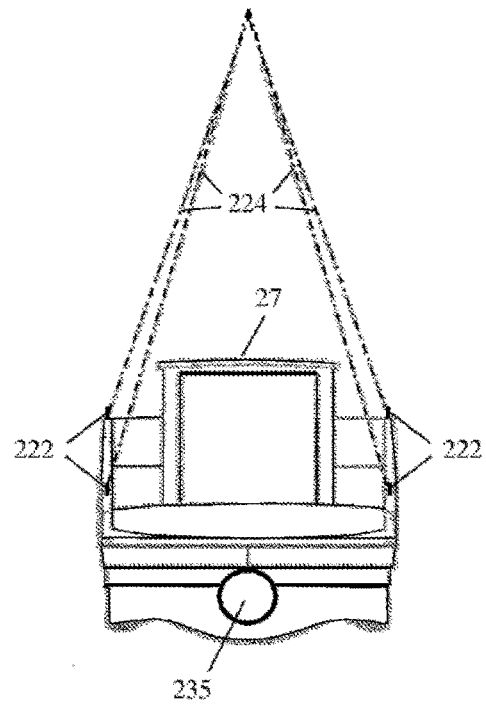
FIG. 15 is a rear elevation corresponding to FIG. 14.

Transportability can be further enhanced by providing the OSRV with in-built lifting points as illustrated in FIGS. 14 and 15 where four lifting points 222 are depicted (with lifting cables 224, shown in chain-dashed lines, already attached). In FIGS. 22 and 23 the dismountable wheelhouse structure 27 is shown dismounted and stowed on the towing deck 16 (with radar scanner removed) thereby decreasing the overall height from the keel to 2.4 m (with the radar scanner left in place the overall height is 2.92 m). The wheelhouse structure 27 is secured in place on the towing deck, for example, by bolting (or otherwise attaching) to fittings integral with the deck. The aft deck rail 30 is put in its lowered position for transportation (for reasons of clarity the aft deck rail has been omitted in FIG. 15).

Transportation of the OSRV 10 overland is effected by loading the OSRV (with its wheelhouse structure dismounted) on a trailer, for example with six or eight wheels and provided with a so-called 'fifth wheel' articulated coupling for linking with a tow vehicle such as a Dodge Ram 3500 Laramie Crew cab model. With the OSRV dimensioned according to the typical dimensions mentioned above, towing on the roads of most countries is permitted without the need for special escorts or "wide load" labels. The OSRV can be launched from its road trailer at an appropriate slipway or beach.

Regarding transportation by sea, the OSRV can readily be stowed aboard a cargo ship (on deck or in a hold or internal dock) for shipping around the world. Furthermore, as more fully described below, the OSRV can be launched and retrieved from a cargo ship (including an oil tanker) to clean up spills caused by that cargo vessel.

Regarding transportation by air, a suitable cargo aircraft would be the C5 GlobeMaster which could accommodate up to eight OSRVs 10 on trailers (with dismounted wheelhouse structures). Other suitable aircraft are the Airbus A400M and Hercules C130, though these will only take one OSRV on a trailer at a time. The OSRV 10 can also be transported slung beneath a helicopter (a rotary wing aircraft).

Operational Use

The described OSRV 10 is well adapted for across a wide range of operational environments and a number of such environments are described below.

Offshore

Figure 16:
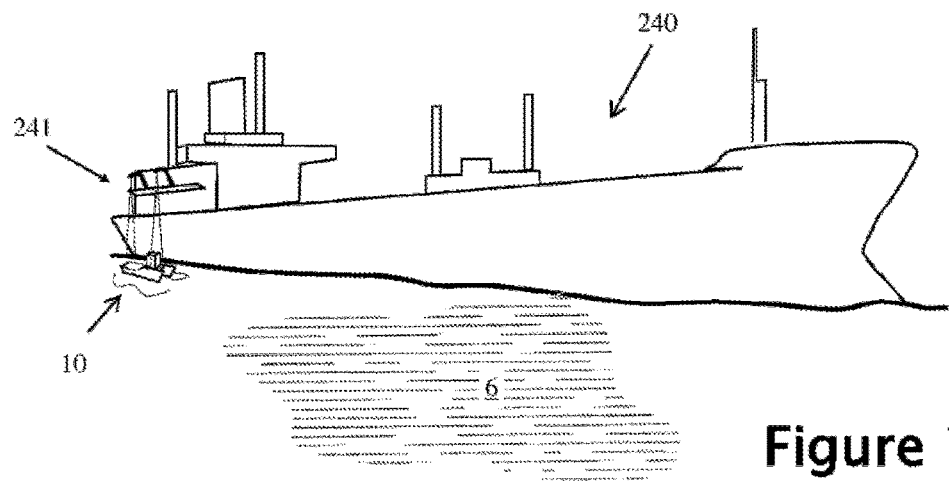
FIG. 16 is a diagram illustrating operation of the FIG. 1 oil spill recovery vessel from a commercial tanker.
Figure 20A:
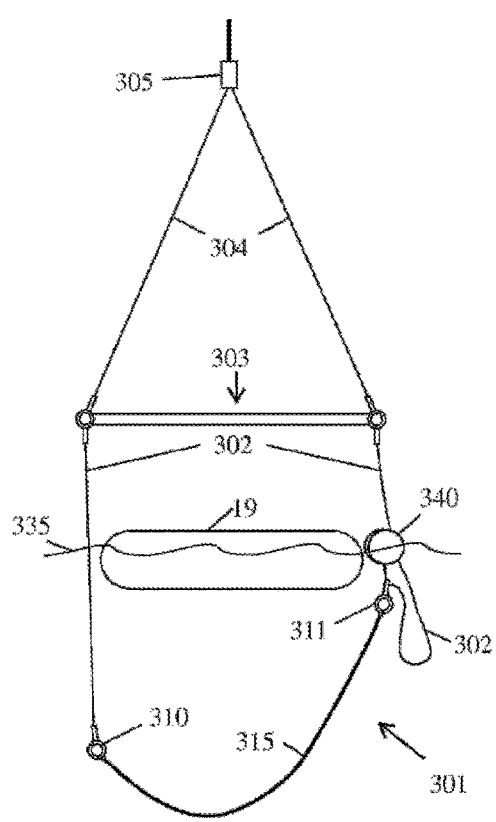
FIG. 20A is an end view of the FIG. 19 lifting rig at a stage during its use when it has been lowered into the water and a bladder is being maneuvered into position for lifting.

Appropriately constructed and equipped, the OSRV 10 has offshore seaworthiness (suitable for use up to 60 nautical miles from land or a mothership). Of particular note is the possibility of having sea-going commercial ships (that is, ships principally engaged in trade and not pollution control) such as oil tankers, container ships and the like, carry an OSRV 10 on board so that the OSRV can then be launched immediately the mothership causes or comes across an oil spill, even if this is in mid ocean. FIG. 16 illustrates the launching of an OSRV 10 from davits 241 of a mothership in the form of oil tanker 240 in order to clean up an oil spill 6 caused by a rupture in the hull of the tanker. As an alternative to launching the OSRV from davits, the OSRV can be stored on deck and launched using a deck crane. Regardless of whether the launch (and recovery) system used is davits or a deck crane, the OSRV 10 is advantageously provided with an extra chunky rub strake to protect the mothership in the event of the OSRV bumping against the side of the mothership during launch and recovery. Where the OSRV is intended for permanent use off a ship, the OSRV can be structurally reinforced to better withstand the rigors of launch and recovery from a ship at sea; although such reinforcement may add to the overall weight, this will not be of great consequence as the OSRV is, in this case, not intended for road or air transport. With regard to bladders filled by the OSRV in operation, these bladders can be towed back to the mothership and either pumped out to tanks onboard the mothership (commercial ships have large integral waste oil tanks), or lifted onboard the mothership for pumping out or deck stowage (a suitable form of lifting rig is described hereinafter with reference to FIG. 20).

Figure 17:
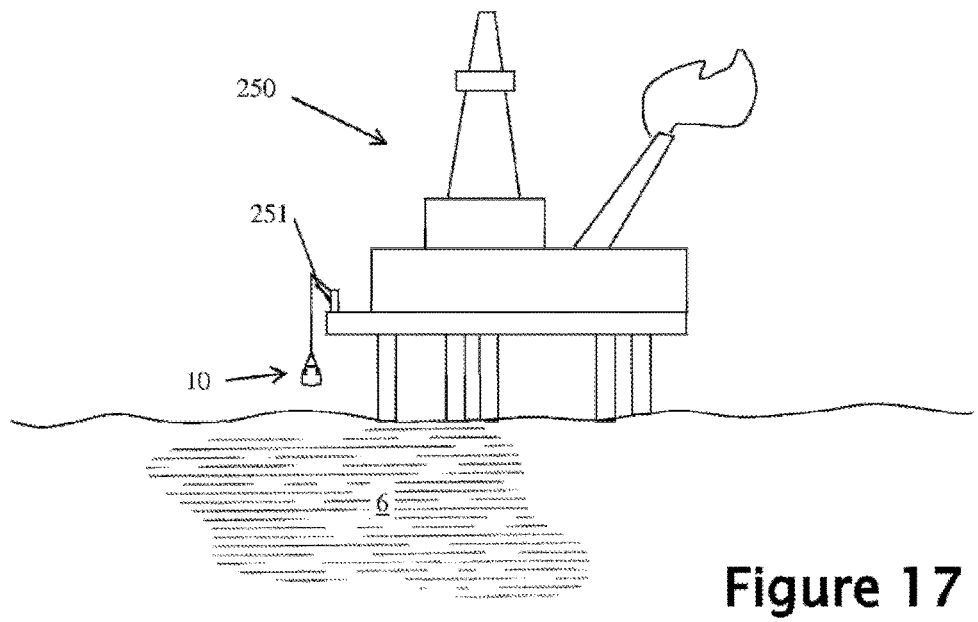
FIG. 17 is a diagram illustrates operation of the FIG. 1 oil spill recovery vessel from an oil platform.

The OSRV 10 can be stationed on oil rigs and accommodation platforms (generically oil platforms) for immediate launch by davits or crane in case of spills followed by recovery of the OSRV to the oil platform. FIG. 17 illustrates this scenario with the OSRV 10 being shown during launch from an oil platform 250 using a crane 251 in order to clean up oil spill 6. Again, recovered oil would be either pumped out from filled bladders to storage tanks on the oil platform or else a lifting rig can be used to lift the bladders aboard the platform.

Inshore

The OSRV 10 is ideally suited for this environment and its shallow draft enables it to approach and operate right up to the shoreline (particularly where the catamaran hulls have the form represented by dashed line 22W in FIG. 2).

Harbors

Figure 18:
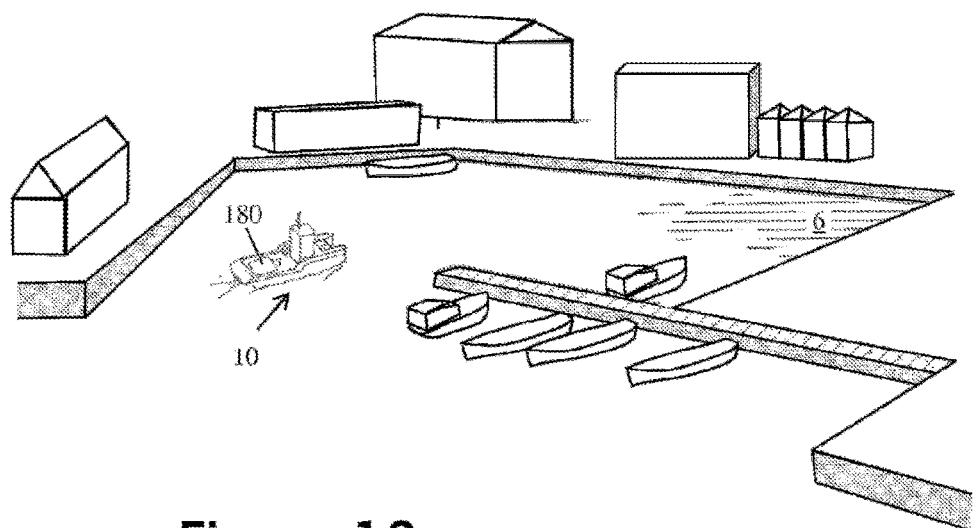
FIG. 18 is a diagram illustrates operation of the FIG. 1 oil spill recovery vessel in a harbor environment.

Although towing a bladder may not be practical in the confined waters of a harbor, as already indicated, recovered oil can be stored to a bladder stowed on the towing deck of the OSRV 10 or in the separators (for small spills). This is illustrated in FIG. 18 where OSRV 10, with a deck-stowed bladder 180 connected to its oil transfer bollard, is depicted on its way to clean up oil spill 6.

Inland Waterways, Wetlands

The shallow draft and maneuverability of the OSRV 10 facilitate its use in these environments though generally it will be necessary to use deck-stowed bladders for storing recovered oil. The use of water jet propulsion is also an advantage as there is no propeller at risk of damage by water-borne debris and underwater obstacles. The ability to reverse the water jet unit 53 (FIG. 6) facilitates the removal of any debris that might collect against the screen 58 protecting the inlet to the water jet unit 53.

Features of the OSRV 10 that contribute to this multi-environment versatility include the dimensions of the OSRV (sufficient for seaworthiness offshore but small enough for transportation; and shallow draft for use inshore and on waterways), the lightness and ease of lifting of the OSRV (which, along with its dimensions, make it easy to transport to any environment, and allow it to be carried on ocean-going ships), the use of water jet propulsion, and the storage options for recovered oil (towed bladder, deck-stowed bladder, separators). With regard to the draft of the vessel, this should be kept to 1 m or below to enable operation in most harbours and waterways, and close to shore; preferably, the draft is 0.5 m or below. The form of the catamaran hulls represented by dashed line 22W in FIG. 2 is particularly useful for enabling the OSRV 10 to approach and operate right up to the shoreline while still serving to guide oil towards the skimmer unit. The range of options for the storage of recovered oil (towed bladder/deck storage/temporary storage in the separators) adds to the operational efficiency of the OSRV.

Bladder Lifting Rig

In certain circumstances, it may be desirable to lift an oil-containing bladder out of the water for pumping out or storage aboard a mothership or on a dock (here taken to include an oil rig) for emptying, assuming that a suitable lifting mechanism (such as a crane) is available. The bladders, when emptied, can be returned to service immediately with the minimum of down-time during an oil-spill clean-up operation.

An example form of lifting rig will now be described with reference to FIGS. 19 and 20. The lifting rig 300 is shown in FIG. 19 in a position clear of the water but without a bladder held in the rig. The lifting rig 300 comprises a sling assembly 301 arranged to provide a cradle for supporting a bladder substantially horizontal along its length during lifting, and a rigid lifting frame 303, here of rectangular form, that is connected to the sling assembly 301 by lifting lines 302. The lifting frame 303 serves to space out the lifting lines 302 and to provide for connection of the lifting rig 300 to a ship or dockside crane or other lifting mechanism (not shown); in the present example, this connection to a lifting mechanism is provided by lines 304 extending between the lifting frame 303 and a lifting head 305 (such as a crane ring) to which a cable 306 of the lifting mechanism attaches.

The sling assembly comprises a sling 315 supported between two rigid side elements 310, 311. The main body of the sling 315 is formed by a rectangular sheet of material, the width of the sheet being such that when passed around the underside of a floating bladder, the sheet will extend up on both sides higher than the mid-point of the sides of the bladder. The main body of the sling 315 is reinforced with lengths of webbing 318 that pass under the main material body and end in loops 317 through which the two side elements 310, 311 extend thereby attaching the sling 315 to these side elements 310, 311. It is the webbing that takes the weight of a bladder cradled in the sling assembly 301. The two ends of the elongate cradle formed by the sling 315 can be closed off by respective detachable end panels 330 only one of which is illustrated in FIG. 19.

The sling assembly 301 is arranged to have a buoyancy distribution such that when lowered into water, the sling 315 stays afloat along one side whereas the remainder of the sling can sink; as will be explained below, this facilitates the maneuvering of a filled bladder over the sling and between the two rows of lifting lines 302. In the present example, the desired buoyancy distribution is achieved by the use of a non-floating material for the sling 15 and the provision of an appropriately sized set of floats 340 securely attached to the side element 311. Other arrangements are possible.

The lengths of the lines 302 and 304 are such that the sling assembly 301 provides a cradle for supporting a bladder substantially horizontally along its length when lifted clear of the water.

In operation, the lifting rig 300 is attached to the lifting cable 306 of a crane or other lifting mechanism. The lifting rig is the raised clear of the deck or dockside to assume its configuration as illustrated in FIG. 19. The lifting rig 300 is then swung out over the water and lowered. As the sling assembly 301 enters the water, it will sink under its own weight except along the side corresponding to the side element 311 to which the floats 340 are attached (see FIG. 20A). The lifting lines 302 attached to the side element 311 will slacken off but those attached to the side element 310 remain taut. Lowering of the lifting rig 300 is stopped when the side element 310 has reached a sufficient depth to ensure that the sling 315 is well under water except for a near vertical portion attaching to the side element 311 (in FIG. 20, the water level is indicated by wavy line 335). A clear channel is now defined between the lifting lines 302 attached to the side element 310, and the side element 311 kept afloat by the buoys 340. A full (or partially full) bladder 19 can now be maneuvered into this channel from one end until the full length of the bladder 19 lies over the sling 315.

With the bladder in position the crane is operated to start raising the lifting rig 300. As the lifting frame 303 rises, the side element 310 is raised out of the water pulling with it the corresponding side of the sling 315 which thereby wraps around the lower half of the bladder. In due course, the lifting lines 304 on both sides of the bladder 19 become taut (see FIG. 20B) and the bladder sits in an elongate cradle formed around it by the sling assembly 301. The end panels 330 can now be attached to close off the cradle and support the ends of the bladder.

Continued operation of the crane lifts the bladder 19 out of the water supported along its length by the sling assembly 301 in a substantially horizontal position. Water within the cradle formed by the sling assembly 301 drains out through the gaps between the end panels 330 and the main body of the sling 315. The lifting frame 303 automatically prevents the lifting lines 302 from closing and cutting into the filled bladder, or exerting side pressure on the filled bladder during the lifting process.

The bladder 19 is in due course deposited on the deck of a mother-ship deck or on the dockside and is then pumped out before being lifted back into the water using the lifting rig 300.

Figure 20B:
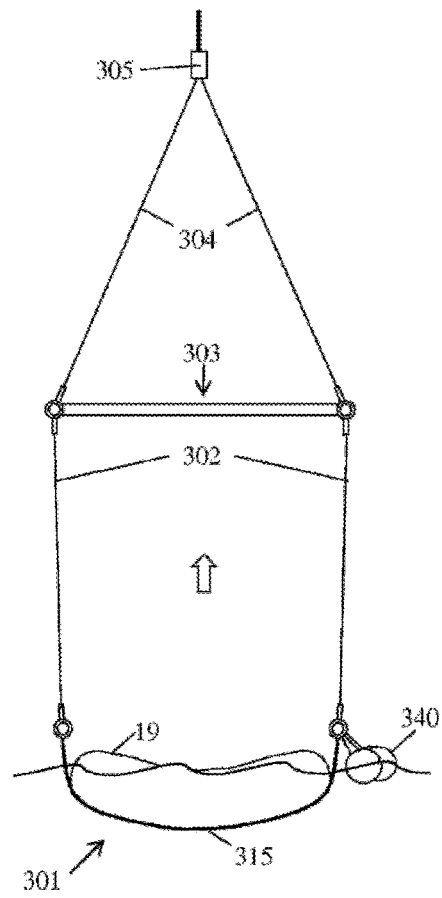
FIG. 20B is an end view of the FIG. 19 lifting rig at a stage during its use when the rig is just taking the weight of a bladder immediately prior to lifting.

As illustrated in FIG. 20B, there will be some slight lateral bowing of the bladder as it is lifted. Some forms of floatable bladders are given hydrodynamic shape with shallow V-bottoms which are readily accommodated by the sling during lifting.

It is to be understood that the above-described form of the OSRV 10 is simply one example of an OSRV that can be employed in implementing the present invention and many variants are possible. For example, the oil/water separators can be omitted and the provision for storing recovered oil to storage may be more limited than that described (such as just deck storage or towed storage but not both). Where recovered oil is transferred to a floating bladder for storage, the transfer arrangement may differ from that described, that is, rather than using an oil transfer bollard such as illustrated in FIGS. 10 to 14, a different arrangement can be employed such as tethering the bladder directly to the stern of the OSRV. Other forms of skimmer unit can be used in place of the described drum skimmer.

The general form of the above-described example of oil spill recovery vessel provides a number of advantages; thus, the catamaran bow section is well adapted for supporting a skimmer unit such that it can be raised clear of the water enabling the OSRV to proceed rapidly to the scene of on oil spill planing on its trimaran section. The conjoined upper portions of the three hulls of the trimaran section provide support for the large aft towing deck below which the central hull provides substantial machinery space. The flow channels defined between the trimaran hulls minimize the build-up of water in front of the skimmer unit when in its operating position.

The above-described example of oil spill recovery vessel also exhibits a set of features providing for versatility of deployment and use. In particular, the OSRV 10 is sufficiently seaworthy as to be capable of operating offshore while also being suitable for inshore and waterway use; operation in these later environments is facilitated by the use of water jet propulsion and the shallow draft (preferably, 1.0 m or below). The form of the catamaran hulls represented by dashed line 22W in FIG. 2 is particularly useful for enabling the OSRV 10 to approach and operate right up to the shoreline while still serving to guide oil towards the skimmer unit. The range of options for the storage of recovered oil (towed bladder/deck storage/temporary storage in the separators) adds to the versatility and operational efficiency of the OSRV.

Although the equipping and operating of a sea-going ship engaged in trade or an oil platform with an oil spill recovery vessel arranged for launch from and recovery to the ship or platform, has been described above with reference to the described example form of OSRV, it is to be understood that any form of OSRV could be used in this role provided it has a skimmer unit and can be launched from and recovered to the ship or platform.

The invention claimed is:

1. An oil spill recovery vessel for recovering oil at a water surface including:
   a fore deck;
   an aft deck;
   a stern;
   a bow section having twin, opposed hulls;
   a water jet propulsion unit positioned at the stern;
   an oil skimmer unit positioned at the bow section and between said opposed hulls, adapted to be lowered to an operating position in the water and adapted to be lifted clear of the water to enable rapid transit by the vessel through the water to an oil spill; and,
   an oil transfer arrangement comprising:
   an oil transfer bollard positioned on the aft deck and adapted for towing an oil storage bladder; and,
   an oil transfer pipe adapted for transferring recovered oil from the vessel while the vessel is in motion.

2. The oil spill recovery vessel according to claim 1, wherein, excluding potential storage capacity provided by any in-built oil/water separators, the vessel has no substantial in-built storage tanks adapted to store recovered oil.

3. The oil spill recovery vessel according to claim 1, wherein the vessel is adapted to be operable in water 1 one meter or more in depth.

4. The oil spill recovery vessel according to claim 1, wherein the weight of the vessel, equipped and without any stored recovered oil, is 3 Tonnes or less.

5. The oil spill recovery vessel according to claim 1, wherein the vessel is operable in water one meter or more in depth, and the weight of the vessel, equipped and without any stored recovered oil, is 3 Tonnes or less.

6. The oil spill recovery vessel according to claim 1 wherein:
   said aft deck is adapted and sized for accommodating a floatable bladder, and,
   said oil transfer arrangement being selectively operable to transfer recovered oil into said bladder or into a towed bladder.

7. A sea-going commercial ship comprising:
   an oil spill recovery vessel provided with an oil skimmer, adapted to be launched from, and recovered to the ship to enable immediate clean up of any spill caused, or occasioned upon, by the ship, said vessel including:
   a fore deck;
   an aft deck;
   a stern;
   a bow section having twin, opposed hulls;
   a water jet propulsion unit positioned at the stern;
   an oil skimmer unit positioned at the bow section and between said opposed hulls, adapted to be lowered to an operating position in the water and adapted to be lifted clear of the water and,
   an oil transfer arrangement comprising:
   an oil transfer bollard positioned on the aft deck and adapted for towing an oil storage bladder; and,
   an oil transfer pipe adapted for transferring recovered oil from the vessel.

8. The ship according to claim 7, wherein said ship is adapted to pump recovered oil from the bladder to storage on board the ship and/or is adapted for lifting the bladder on board the ship.

9. An oil platform comprising:
   an oil spill recovery vessel provided with an oil skimmer, adapted to be launched from and recovered to the platform to enable immediate clean up of any spill caused, or occasioned upon, by the platform, said vessel including:
   a fore deck;
   an aft deck;
   a stern;
   a bow section having twin, opposed hulls;
   a water jet propulsion unit positioned at the stern;
   an oil skimmer unit positioned at the bow section and between said opposed hulls, adapted to be lowered to an operating position in the water and adapted to be lifted clear of the water and,
   an oil transfer arrangement comprising:
   an oil transfer bollard positioned on the aft deck and adapted for towing an oil storage bladder; and,
   an oil transfer pipe adapted for transferring recovered oil from the vessel.

10. The platform according to claim 9, wherein said platform is adapted to pump recovered oil from the bladder to storage on board the platform and/or is adapted for lifting the bladder on board the platform.

* * * * *